United States Patent [19]

Faunce

[11] Patent Number: 4,671,009
[45] Date of Patent: Jun. 9, 1987

[54] BOAT FISHING ORGANIZER FORMED AS BASKET-LIKE STRUCTURE WITH ATTACHMENT MEANS FOR FISHING ACCESSORIES

[76] Inventor: Daniel H. Faunce, 248 Crosby, P.O. Box 639, Tekoa, Wash. 99033

[21] Appl. No.: 898,504

[22] Filed: Aug. 21, 1986

[51] Int. Cl.⁴ .............................................. A01K 97/00
[52] U.S. Cl. ...................................... 43/54.1; 43/21.2; 211/181
[58] Field of Search .................. 206/315.11; 224/920; D3/38; 248/249; 211/181, 119; 43/54.1, 21.2, 57.1

[56] References Cited

U.S. PATENT DOCUMENTS

| | | | |
|---|---|---|---|
| 1,136,331 | 4/1915 | Harding | 211/181 |
| 2,239,369 | 4/1941 | Nauert | 211/181 |
| 2,316,833 | 4/1943 | Baron | 43/57.1 |
| 2,956,689 | 10/1960 | Van der Togt | |
| 2,972,417 | 2/1961 | Smith | 211/181 |
| 3,126,180 | 3/1964 | Mandolare | 43/21.2 |
| 3,667,708 | 6/1972 | Smeltzer | 43/21.2 |
| 3,775,895 | 12/1973 | Jachim | 43/54.1 |
| 3,824,732 | 7/1974 | Cordell, Jr. | |
| 4,095,364 | 6/1978 | Prine | |
| 4,271,624 | 6/1981 | Peluso | |

Primary Examiner—Nicholas P. Godici
Assistant Examiner—G. M. Reid
Attorney, Agent, or Firm—H. Jay Spiegel

[57] ABSTRACT

The present invention relates to a boat fishing organizer wherein a plurality of objects and implements which are used when fishing from a boat may be conveniently stored and organized for easy availability and use. The device includes a basket-like receptacle having hooks thereon so that it may be mounted on the gunwhale of the boat. Attached to the receptacle portion are loops to store a fishing net, a device for storing an extra spool of fishing ine, an elongated bar on which hooks and sinkers may be removably attached and a device for supporting in an upright angular orientation a fishing rod. The receptacle portion may be used to store various items including a tackle box.

9 Claims, 2 Drawing Figures

BOAT FISHING ORGANIZER FORMED AS BASKET-LIKE STRUCTURE WITH ATTACHMENT MEANS FOR FISHING ACCESSORIES

BACKGROUND OF THE INVENTION

The present invention relates to a boat fishing organizer. In the prior art, storage devices are known, however, a need has developed for a storage device for use by a fisherman which may easily store all objects and implements which a fisherman may need in fishing from a boat. Thus, a need has developed for such a device which combines simplicity with completeness of purpose so that all objects and implements which may be used by a fisherman when fishing from a boat may be conveniently accessible on one device.

The following prior art is known to applicant:

U.S. Pat. No. 2,956,689 to Van der Togt discloses a receptacle for supporting items which includes a pair of hooks to hook over a wall 5, a platform area for supporting articles and a pivoting wall portion to enable one to access items on the platform area. The present invention is vastly different from the teachings from Van der Togt since Van der Togt merely provides a platform area for supporting various articles but does not include any of the various attachments thereto which are contemplated herein which enable one to store specific implements which are used for fishing.

U.S. Pat. No. 3,824,732 to Cordell, Jr. discloses a receptacle device having an open top compartment and lid having a plurality of compartments therein for storing various items such as small items of fishing gear or tackle. Of course, the present invention is vastly different from the teachings of this patent since the present invention includes means for rendering the inventive organizer portable and further includes both a large receptacle area and a plurality of other features which enable the inventive organizer to support objects and implements which are used for fishing.

U.S. Pat. No. 4,095,364 to Prine discloses a fishing rod holder for a fishing tackle box wherein the tackle box includes the fishing rod holder attached to a side thereof. Of course, the present invention is different from the teachings of Prine since Prine merely discloses a tackle box having a fishing rod attached thereto whereas the present invention includes a receptacle for removably containing, for example, a tackle box and which device has separate from the tackle box a means which may contain therein a fishing rod holder.

U.S. Pat. No. 4,271,624 to Peluso discloses a portable tackle and bait holder having means for removably mounting it on the gunwhale of a boat and further having a plurality of receptacles to store various fishing implements. The present invention is distinct from the teachings of Peluso since the present invention is made of an open construction which may be manufactured either through molding, when made of plastic, or through welding of metal rods together in an easy and inexpensive way. Further, the present invention has many specific structural differences from the teachings of Peluso, including the specific structure for a net holder, a holder for a spool of fishing line and a holder for a fishing rod.

SUMMARY OF THE INVENTION

The present invention relates to a boat fishing organizer. The present invention overcomes all of the deficiencies as set forth in the prior art described hereinabove and provides a new boat fishing organizer which is simple in construction, extremely versatile and portable, and which includes features which will enable a fisherman to fish from a boat having all the objects and implements necessary to do so stored in one convenient location. The present invention includes the following features and aspects:

(a) In a first aspect of the present invention in the preferred embodiment thereof, the inventive organizer, includes a receptacle portion formed by a plurality of elongated rods forming a floor as well as open walls.

(b) Extending upwardly and outwardly from the receptacle portion are a pair of hook members which are sized, adjustably, to enable one to place the inventive organizer over the gunwhale of the boat. If desired, additional fastening means may be associated with these hook members so as to enable them to be releasably clamped to the boat gunwhale.

In a further aspect, on one side of the receptacle portion, one of the rods forming the floor of the receptacle portion extends laterally therefrom and has mounted thereon an elongated tube which may rest in angular fashion against an arm extending outwardly from an open wall of the receptacle portion in the same direction as the direction of elongation of the above-mentioned rod. Into this tube may be inserted the handle end of a fishing rod to support the fishing rod in a angular relation with respect to the inventive organizer and the boat to which it is attached.

(c) In a further aspect, a small pipe may be attached to one of the open walls of the receptacle portion through which may be inserted a bolt to which may be fastened, if desired, a spare spool of fishing line. The bolt may have a nut attached thereto so as to tightly fasten the spool thereto or, alternatively, the spool may be allowed to turn freely so that with the spool so mounted the fisherman may unreel extra fishing line as desired.

(d) In a further aspect, one or more of the open walls of the receptacle portion may have attached thereto one or more loop portions sized so as to receive the handle of various fishing implements such as, for example, a fishing net. Of course, other implements such as a gaff and a spare fishing rod may also be suitably stored through the use of these loops.

(e) Further, the elongated rods which form the floor and open walls of the receptacle portion may be of a diameter specifically designed so that one may easily store hooks, sinkers, and other artificial lures thereon merely by fastening hooks or other protrusions thereof over the surface of such elongated rods. In the preferred embodiment of the present invention, it may be made of either molded plastic or metal and when made of metal, may comprise a plurality of rods welded together to form the invention.

Accordingly, it is the first object of the present invention to provide an improved boat fishing organizer. It is a still further object of the present invention to provide such a fishing organizer including a receptacle portion which may be utilized to store such items as a fishing tackle box, bait bucket, etc.

It is a still further object of the present invention to provide such a boat fishing organizer including means for supporting a fishing reel, a fishing net, a spare spool of fishing line, and various hooks, lures, and other small fishing implements.

It is a still further object of the present invention to provide such a boat fishing organizer including means for supporting a fishing reel, a fishing net, a spare spool of fishing line and various hooks, lures, and other small fishing implements.

It is a still further object of the present invention to provide such a boat fishing organizer with hooks to facilitate the attachment of the device over the gunwhale of a boat.

These and other objects, aspects and features of the present invention may be better understood from the following detailed description of the preferred embodiments when read in conjunction with the appended drawing figures.

SPECIFIC DESCRIPTION OF THE PREFERRED EMBODIMENTS

Figure 2:
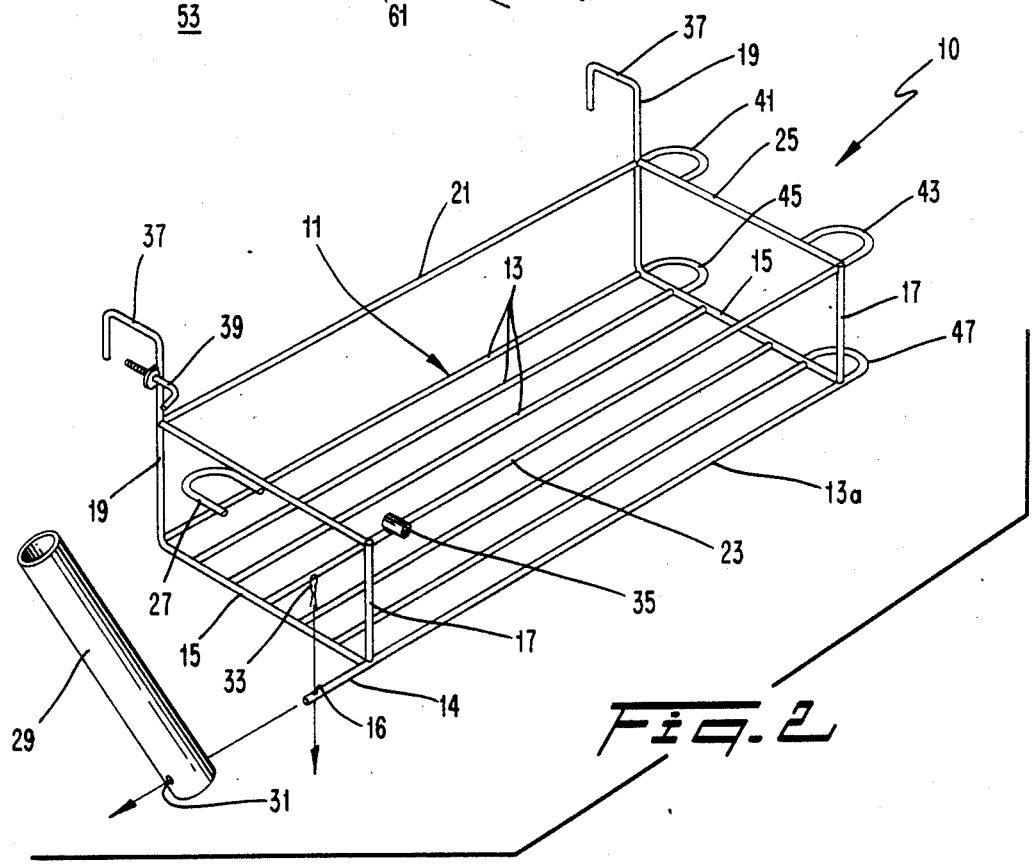
FIG. 2 shows a further perspective view of the inventive organizer, partially exploded and without implements attached thereto so that detail may be seen.

With reference to FIG. 2, the inventive organizer generally designated by the reference 10 includes a receptacle portion 11 which is formed by a plurality of elongated rods 13, 13a which are preferably maintained in parallel relation by welding of their opposed ends to respective side rods 15. Further, upstanding rods 17, 19 extend upwardly from the side rods 15 which elongated rods 21, 23 extend parallel to the elongated rods 13, 13a and further side rods 25 extend parallel to the side rods 15. All of the above described rods are welded in a manner so as to form the receptacle portion designated by the reference 11 in FIG. 2.

With further reference to FIG. 2, it is seen that the elongated rod 13a is elongated past one of the side rods 15 and includes an extended portion 14 having a hole therethrough. Furthermore, the side rod 25 adjacent thereto has welded thereto a hook device 27 for a purpose to be described in greater detail hereinafter.

As seen in FIG. 2, an elongated tube 29 includes a hole 31 therethrough which is sized so that it may be inserted over the end 14 of the elongated rod 13a and may thereafter be pivoted until it rests against a hook 27, with a cotterpin 33 being inserted into the hole 16 in the end 14 of the elongated rod 13a to thereby releaseably mount the elongated tube 29 over the end 14.

Further, the elongated rod 23 has welded thereto a short piece of tubing 35 through which may be inserted a bolt (not shown) for a purpose to be described in greater detail hereinafter.

With further reference to FIG. 2, it is seen that the rods 19 terminated in hook portions 37 sized to snugly fit over the gunwhale of a boat and with further reference to FIG. 2, it is seen that a threaded key member 39 may be associated with each hook 37 so as to enable one to snugly mount the inventive organizer on the gunwhale of a boat by tightening the keys 39 after the hooks 37 have been placed over the gunwhale of the boat.

As further shown in FIG. 2, the side rods 15 and 25 may have fixedly attached thereto loop members 41, 43, 45 and 47. These loop members may be sized so as to receive respective handles of various fishing implements such as gaffs and nets, etc.

Figure 1:
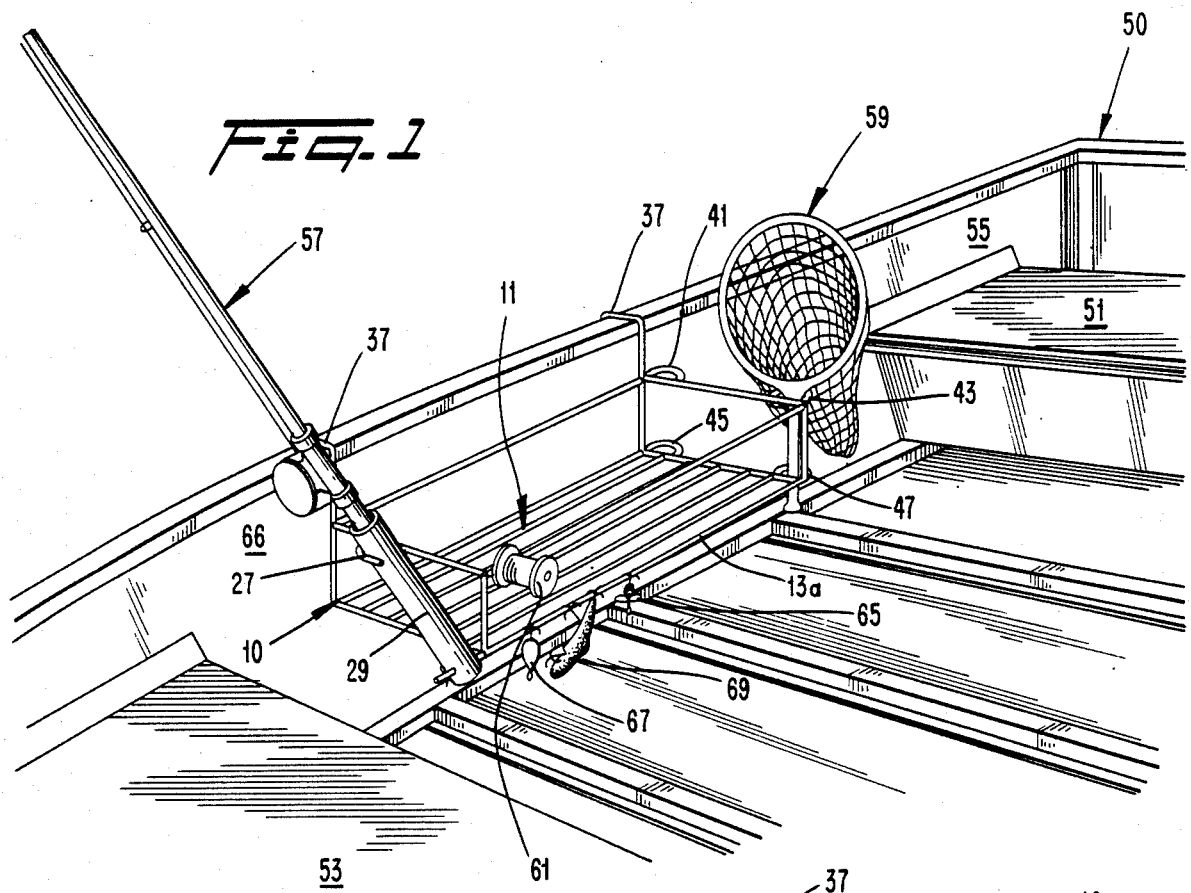
FIG. 1 shows a perspective view of the preferred embodiment of the present invention as mounted on the gunwhale of a boat and showing various implements associated therewith.

With reference now to FIG. 1, a boat 50 is seen to include benches 51, 53 and a gunwhale 66 over which are mounted the hooks 37 of the inventive organizer 10. While not shown in FIG. 1, the receptacle portion 11 may be utilized to store various fishing items such as, for example, a tackle box, a bait bucket, or the like. Further, the elongated tube 29 is shown in mounted position leaning against the hook 27 with a fishing rod 57 inserted therein and supported thereby. Further, a fishing net 59 is seen to be releaseably supported within the loop members 43, 47 with the loop members 41, 45 being available to store whatever is desired.

With further reference to FIG. 1, it is seen that a spool of fishing line 61 is mounted in association with the short piece of tubing 35 best seen in FIG. 2. Such mounting is accomplished by inserting a headed bolt from the receptacle 11 side of the tube 35 outwardly therethrough, then installing the spool 61 over the bolt and thereafter threading a nut over the distal end of the bolt to thereby removably fasten the spool 61 thereto. If desired, the net may be tightened about the bolt so as to fasten the spool 61 nonrotatably thereon or, alternatively, the nut may be left loose so that the spool may be rotated to thereby enable the fisherman to unwind fishing line as desired.

With further reference to FIG. 1, it is seen that the elongated rod 13a is sized so that it may removably support a hook 65, a sinker 67, a lure 69, and various other small fishing implements as desired.

In the preferred embodiment of the present invention, the inventive organizer 10 is made by welding a plurality of elongated and bent and curved metal rods together so as to form the device depicted in the figures. Further, the elongated tube 29 is preferably made of a plastic material whereas the short tube 35 is preferably made of metal. If the organizer 10 is to be made of plastic, it may be made through any known method such as, for example, injection molding, ultrasonic welding of plastic tubing and the like. Of course, the elongated tube 29 may be made of any desired material so long as it may be provided with a hole 31 therethrough for the purposes explained in greater detail hereinabove.

Accordingly, an invention has been described hereinabove which fulfills each and every one of the objects set forth above and which provides an improved boat fishing organizer which will enable a fisherman to have all implements, objects and devices which are necessary for fishing completely accessible and easy to reach and use. Various modifications, changes and alterations of the teachings of the present invention may be contemplated by those skilled in the art without departing from the intended spirit and scope thereof. Accordingly, it is stressed that it is intended that the present invention only be limited by the terms of the appended claims.

I claim:
1. A fishing organizer comprising:
   (a) a receptacle portion including a floor, open sides and being upwardly open;
   (b) attaching means connected to said receptacle portion for attaching said organizer to a surface;
   (c) first supporting means for supporting a fishing rod in an upstanding orientation with respect to said floor, said first supporting means comprising:

(1) an elongated rod extending laterally from said floor;
(2) a tube pivotably mounted on said elongated rod at the end thereof and a hook extending from one of said sides and adapted to support another end of said tube;
(3) said fishing rod being insertable into said tube;
(d) second supporting means for supporting an implement; and
(e) third supporting means for supporting one of a fishing lure, a sinker or a fishing float.

2. The invention of claim 1, wherein said floor comprises a plurality of spaced substantially parallel elongated rods.

3. The invention of claim 1, wherein said attaching means comprises a plurality of hooks, at least one of said hooks including a threaded clamping member for releasably fastening said at least one of said hooks to said surface.

4. The invention of claim 3, wherein said surface comprises a boat gunwhale.

5. The invention of claim 1, wherein said second supporting means comprises a loop attached to one of said walls.

6. The invention of claim 5, wherein said implement comprises a net with a handle insertable into said loop.

7. The invention of claim 1, wherein said third supporting means comprises an elongated rod forming a portion of said floor.

8. The invention of claim 1, made of plastic.

9. The invention of claim 1, made of metal.

* * * * *